United States Patent
Li

(10) Patent No.: US 11,736,945 B2
(45) Date of Patent: Aug. 22, 2023

(54) METHOD FOR HANDLING PSEUDO BASE STATION, MOBILE TERMINAL, AND STORAGE MEDIUM

(71) Applicants: Shenzhen HeyTap Technology Corp., Ltd., Guangdong (CN); GUANGDONG OPPO MOBILE TELECOMMUNICATIONS CORP., LTD., Guangdong (CN)

(72) Inventor: Weiqing Li, Guangdong (CN)

(73) Assignees: SHENZHEN HEYTAP TECHNOLOGY CORP., LTD., Shenzhen (CN); GUANGDONG OPPO MOBILE TELECOMMUNICAITONS CORP., LTD., Dongguan (CN)

( * ) Notice: Subject to any disclaimer, the term of this patent is extended or adjusted under 35 U.S.C. 154(b) by 141 days.

(21) Appl. No.: 17/242,184

(22) Filed: Apr. 27, 2021

(65) Prior Publication Data

US 2021/0250769 A1    Aug. 12, 2021

Related U.S. Application Data

(63) Continuation of application No. PCT/CN2018/113208, filed on Oct. 31, 2018.

(51) Int. Cl.
*H04W 12/12* (2021.01)
*H04W 12/08* (2021.01)
*H04W 48/02* (2009.01)

(52) U.S. Cl.
CPC .......... *H04W 12/12* (2013.01); *H04W 12/08* (2013.01); *H04W 48/02* (2013.01)

(58) Field of Classification Search
CPC ...... H04W 12/08; H04W 12/12; H04W 48/02
USPC ......................................................... 455/410
See application file for complete search history.

(56) References Cited

U.S. PATENT DOCUMENTS

| 6,490,455 B1 | 12/2002 | Park et al. | |
|---|---|---|---|
| 2005/0064922 A1 | 3/2005 | Owens et al. | |
| 2014/0036696 A1* | 2/2014 | Lee ........................ | H04W 76/15 370/252 |
| 2016/0381545 A1 | 12/2016 | Zhibi et al. | |
| 2017/0339608 A1 | 11/2017 | Hengbin et al. | |

(Continued)

FOREIGN PATENT DOCUMENTS

| CN | 104754610 A | 7/2015 |
|---|---|---|
| CN | 106028341 A | 10/2016 |

(Continued)

OTHER PUBLICATIONS

Extended European Search Report for EP Application 18938625.3 dated Sep. 24, 2021. (8 pages).

(Continued)

*Primary Examiner* — Joel Ajayi
(74) *Attorney, Agent, or Firm* — Young Basile Hanlon & MacFarlane, P.C.

(57) ABSTRACT

Disclosed are a method and device for handling a pseudo base station. The method includes: performing restriction processing on a registration network of the mobile terminal at the pseudo base station in response to determining a pseudo base station; and prohibiting accessing the pseudo base station in response to the restriction processing.

14 Claims, 9 Drawing Sheets

(56) References Cited

U.S. PATENT DOCUMENTS

2018/0302794 A1  10/2018  Liu
2019/0053191 A1* 2/2019  Balappanavar ......... H04W 4/44
2019/0327612 A1* 10/2019 Bishop ................. H04W 12/06

FOREIGN PATENT DOCUMENTS

| CN | 106211162 A | 12/2016 |
| CN | 106255115 A | 12/2016 |
| CN | 106332087 A | 1/2017 |
| CN | 106412914 A | 2/2017 |
| CN | 106686562 A | 5/2017 |
| CN | 107241720 A | 10/2017 |
| CN | 107659938 A | 2/2018 |
| CN | 107959936 A | 4/2018 |

OTHER PUBLICATIONS

International Search Report for PCT Application PCT/CN2018/113208 dated May 29, 2019. (8 pages).
Chinese Office Action with English Translation for CN Application 201880097567.1 dated Dec. 21, 2022. (24 pages).

\* cited by examiner

METHOD FOR HANDLING PSEUDO BASE STATION, MOBILE TERMINAL, AND STORAGE MEDIUM

CROSS-REFERENCE TO RELATED APPLICATION(S)

This application is a continuation application of International Application No. PCT/CN2018/113208, filed on Oct. 31, 2018, the entire contents of which are incorporated herein by reference.

TECHNICAL FIELD

The present disclosure relates to a field of mobile terminal technology, and particularly to a method and an apparatus for handling a pseudo base station, a mobile terminal and a storage medium.

BACKGROUND

A "pseudo base station", namely a fake base station, generally consists of a host and a laptop computer. It may acquire mobile phone card information centered on it within a certain radius through related devices such as a short message group sender and a short message sender. On one hand, it illegally uses mobile phone numbers of someone else to send short messages such as fraud and advertising to the user's mobile phone forcibly through disguised as the operator's base station by taking advantage of shortcomings of mobile communication, on the other hand, it is configured to track criminal suspects.

SUMMARY

A method and an apparatus for handling a pseudo base station and a storage medium are proposed in the present disclosure.

A method for handling a pseudo base station for a mobile terminal is provided in embodiments of the present disclosure. The method includes: performing restriction processing on a registration network of the mobile terminal at the pseudo base station in response to determining a pseudo base station; and prohibiting accessing the pseudo base station in response to the restriction processing meeting the preset condition.

A mobile terminal for handling a pseudo base station is provided in embodiments of the present disclosure. The mobile terminal includes: one or more processors; a memory storing instructions executable by the one or more processors; in which the one or more processors are configured to: perform restriction processing on a registration network of the mobile terminal at the pseudo base station in response to determining a pseudo base station; prohibit accessing the pseudo base station in response to the restriction processing meeting the preset condition.

A computer readable storage medium is provided in embodiments of the present disclosure, wherein the computer readable storage medium stores a program code, and the program code may be called by the processor to execute a method for handling a pseudo base station, in which the method includes: performing restriction processing on a registration network of the mobile terminal at the pseudo base station in response to determining a pseudo base station; and prohibiting accessing the pseudo base station in response to the restriction processing meeting a preset condition.

BRIEF DESCRIPTION OF DRAWINGS

In order to explain the technical solutions in embodiments of the present disclosure more clearly, the appended drawings described in the embodiments will be briefly introduced below. Obviously, the appended drawings described as below are only some embodiments of the present disclosure. Those skilled in the art may obtain other appended drawings from these drawings without creative work.

DETAILED DESCRIPTION

In order to make those skilled in the art better understand the technical solution of the present disclosure, the technical solution in embodiments of the present disclosure will be described clearly and completely in combination with appended drawings in embodiments of the present disclosure.

With the significant development of mobile communication technology, mobile communication has experienced the development of multiple versions such as 2G, 3G and 4G. Whether a Global System for Mobile Communication (GSM) or a CDMA (Code Division Multiple Access) communication system in the early 2G era or a LTE (long-term evolution) system architecture in the later 4G era, a base station is a relatively important communication device.

Figure 1:
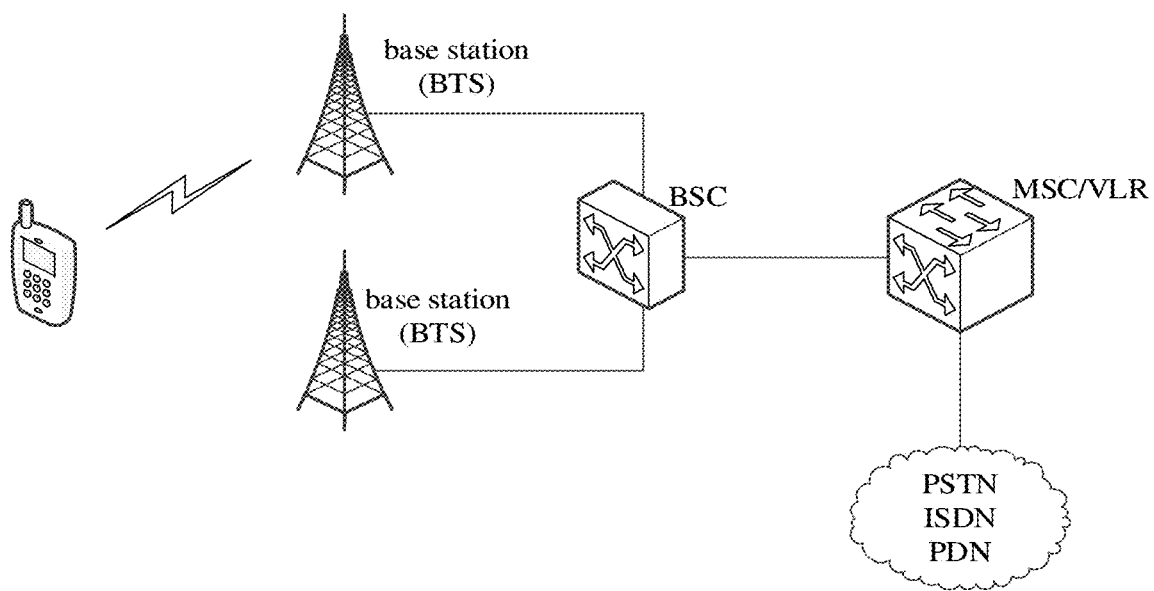
FIG. 1 is a schematic diagram illustrating a system architecture of a mobile communication network provided in an embodiment of the present disclosure.
Figure 2:
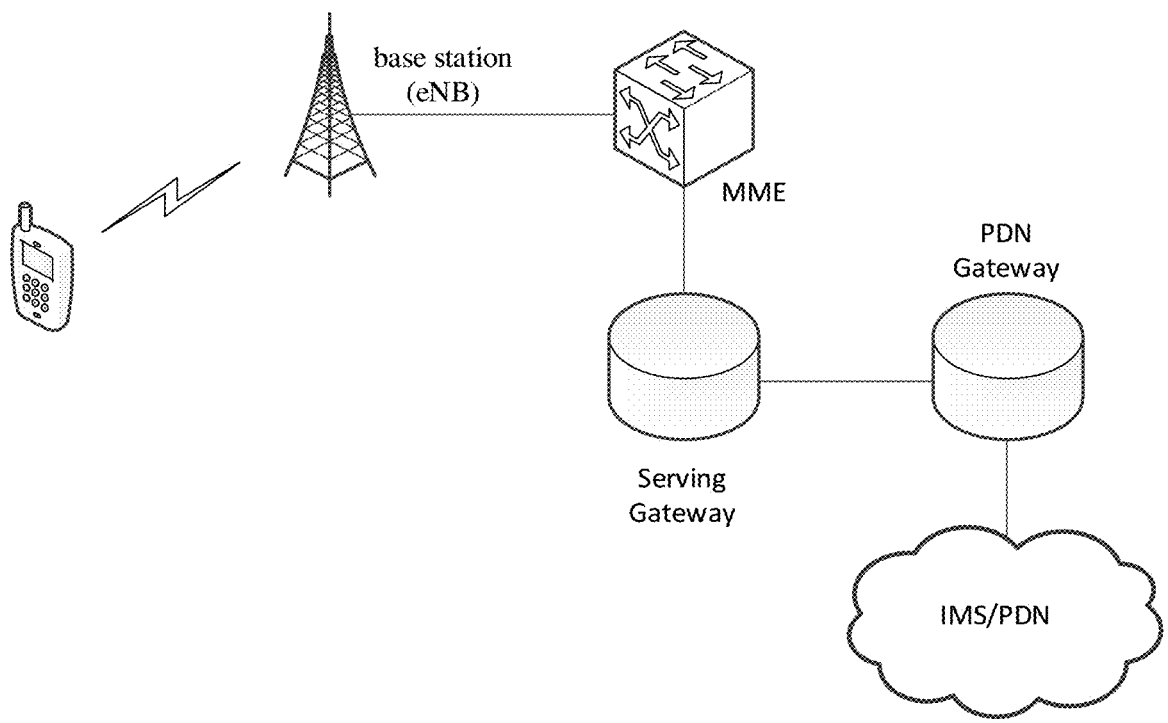
FIG. 2 is a schematic diagram illustrating a system architecture of another mobile communication network provided in an embodiment of the present disclosure.

For example, a schematic diagram illustrating a 2G mobile communication system architecture as shown in FIG. 1. A base transceiver station (BTS) as an access device of a mobile communication channel is connected to a Base Station Controller (BSC), and then the BSC is connected to a mobile switching center (MSC). For another example, a schematic diagram illustrating a 4G mobile communication system architecture as shown in FIG. 2. A base station evolved node B (eNB) is connected to a Mobility Management Entity (MME), and the MME is connected to a Serving Gateway. It can be seen from FIG. 1 and FIG. 2 that, in a mobile communication system, a base station, as a device that directly establishes connection with a mobile terminal, has a relatively important position in the overall system architecture. A base station, generally refers to a "public mobile communication base station", mainly configured to provide signals to a mobile terminal such as a mobile phone, a tablet computer. Base station facilities are not only in the hands of major operators and device manufacturers, but also can be often seen in major universities, research institutes and scientific research institutions, which speeds up frequency of communication technology upgrades and shortens transition time of business application development. Therefore, with the development of communication technology, a pseudo base station appears.

A "pseudo base station", namely a fake base station, is an illegal base station in addition to a mobile communication network. It generally consists of a host and a laptop computer. It may acquire mobile phone card information centered on it within a certain radius through related devices such as a short message group sender and a short message sender. It illegally uses mobile phone numbers of someone else to send short messages such as fraud and advertising to the user's mobile phone forcibly through disguised as the operator's base station by taking advantage of shortcomings of 2G mobile communication.

When a pseudo base station device operates, a wireless signal sent by a mobile terminal is forcibly connected to the device, which causes the mobile terminal unable to normally use the service provided by the operator. The mobile terminal generally may be returned to normal after temporarily off line for 8-12 seconds, and some mobile terminals must start up and shut down to re-enter the network. In addition, it may also cause mobile terminal users to frequently update their locations, so that wireless network resources in this area are strained and network congestion appears, to affect normal communication of users.

However, through a long-term research, it can be found that although some offenders may illegally use mobile phone numbers of someone else to forcibly send short messages such as fraud and advertising to the user's mobile phone through disguised as the operator's base station by taking advantage of shortcomings of 2G mobile communication, which causes inconvenience for the user. However, at the same time, a security monitoring system may also track criminal suspects by taking advantage of a pseudo base station (also called an electronic fence). Therefore, if a mobile terminal is avoided from being attacked by an illegal pseudo base station, a mobile terminal needs to be prohibited from accessing a pseudo base station. However, at the same time, a mobile terminal may also be prohibited from being tracked by a security monitoring system, and user's safety cannot be guaranteed. Based on the above problems, a method and an apparatus for handling a pseudo base station, a mobile terminal and a storage medium are provided in the present disclosure. When it is determined that the detected base station is a pseudo base station, restriction processing is performed on the registration network of the mobile terminal at the pseudo base station, and when the restriction processing meets the preset conditions, the mobile terminal is prohibited from accessing the pseudo base station, thereby restricting the pseudo base station from excessively affecting normal business of the user and improving information security of the mobile terminal. The specific method for handling a pseudo base station is described in detail in the subsequent embodiments.

Embodiments

Figure 3:
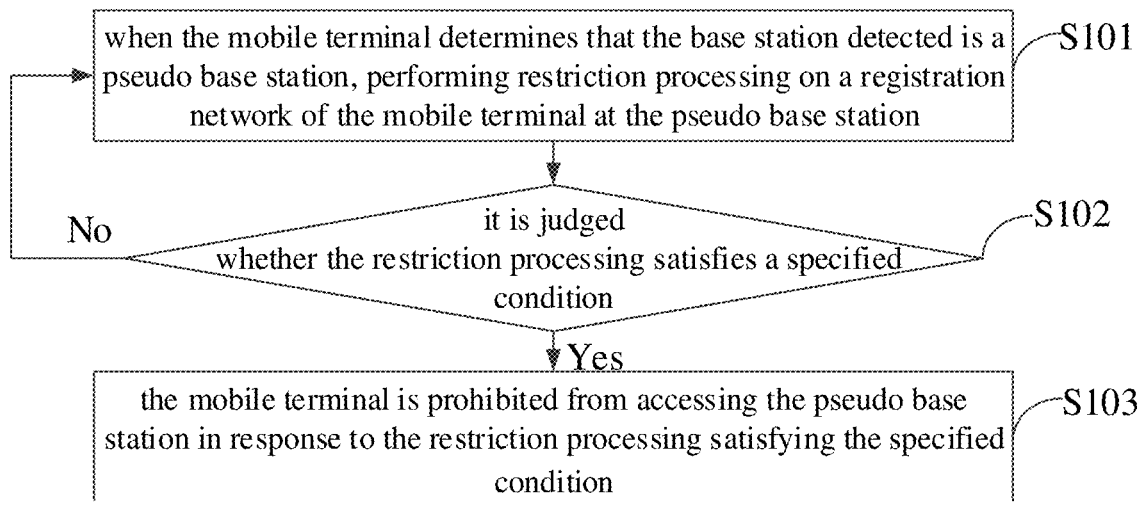
FIG. 3 is a flowchart illustrating a method for handling a pseudo base station in an embodiment of the present disclosure.
Figure 9:
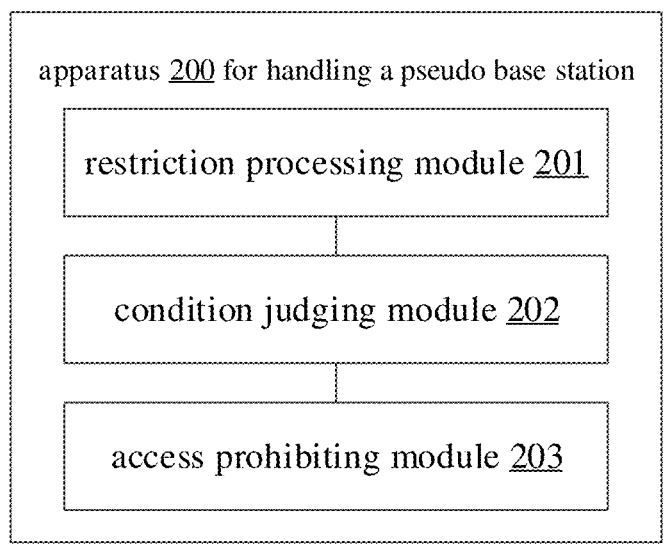
FIG. 9 is a module block diagram illustrating an apparatus for handling a pseudo base station in an embodiment of the present disclosure.
Figure 11:
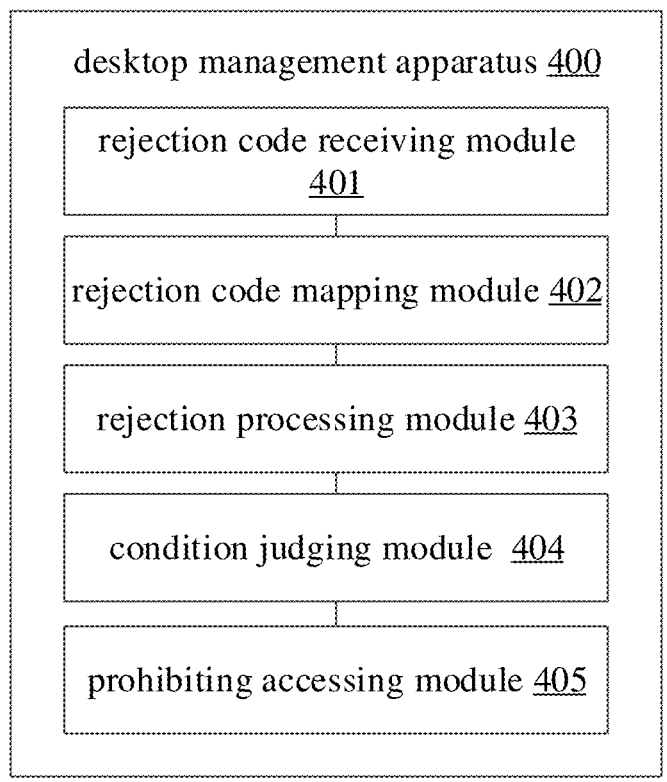
FIG. 11 is a module block diagram illustrating an apparatus for handling a pseudo base station in another embodiment of the present disclosure.

Referring to FIG. 3, FIG. 3 is a flowchart illustrating a method for handling a pseudo base station in an embodiment of the present disclosure. The method for handling a pseudo base station is configured to perform restriction processing on the registration network of the mobile terminal at the pseudo base station when the mobile terminal determines that the detected base station is a pseudo base station, and prohibit the mobile terminal from accessing the pseudo base station when the restriction processing meets the preset conditions, thereby restricting the pseudo base station from excessively affecting normal business of the user and improving information security of the mobile terminal. In a specific embodiment, the method for handling a pseudo base station is applied to an apparatus 200 for handling a pseudo base station as shown in FIG. 9 and a mobile terminal 100 configured with the apparatus 200 for handling a pseudo base station (FIG. 11). Taking a mobile terminal for an example, the specific procedures of the embodiments are described. It is understandable that, a mobile terminal applied in the embodiment may be a smart phone, a tablet computer, a wearable electronic device, etc., which will not be defined here. The procedure shown in FIG. 3 will be described in detail below. The method for handling a pseudo base station may specifically include followings.

At block S101, restriction processing is performed on a registration network of the mobile terminal at the pseudo base station in response to determining a pseudo base station.

Generally, a network air interface is configured to implement information exchange between a mobile terminal and a base station of a mobile communication network, and information on the network air interface is borne by various logical channels. A logical channel is divided into two categories: a traffic channel (TCH) and a control channel (CCH). A TCH is mainly configured for transmission services between a network and a mobile terminal, such as voice, data, etc.; a CCH is a channel configured to transmit signaling information and short grouped data, a broadcast channel (BCH) in the CCH is configured to transmit information by broadcasting, and a broadcast control channel (BCCH) in the BCH is configured to broadcast common information by a base station to a mobile terminal, for example, a system message.

Therefore, a mobile terminal may detect a base station by monitoring broadcast information of the base station and judge whether the detected base station is a pseudo base station. For example, the mobile terminal may obtain broadcast information of a base station, extract identification information of the base station from the broadcast information, and judge whether the base station is a pseudo base station based on the identification information. Specifically, identification information may include a tracking area (TAC), a location area code (LAC), a cell identity (CID), etc. of a base station cell corresponding to a base station. Therefore, as a way, when a mobile terminal detects a new base station, the difference between the TAC/LAC/CID of the base station cell corresponding to the base station and the TAC/LAC/CID of the base station cell recently successfully registered by the mobile terminal may be calculated. If the difference is greater than a set threshold, it may be determined that the base station detected by the mobile terminal is a pseudo base station.

Further, when it is determined that the detected base station is a pseudo base station, since it cannot be determined whether the pseudo base station is a pseudo base station used by offenders or a pseudo base station used by a security monitoring system, if the pseudo base station is prohibited directly and completely, although the possibility of the mobile terminal being attacked by the pseudo base station may be avoided, the mobile terminal may be completely prohibited from being monitored and tracked by the security monitoring system, and adverse effects may be caused. Therefore, as a way, restriction processing is performed on the registration network of the mobile terminal at the pseudo base station, to reduce the mobile terminal frequently being attacked by the pseudo base station and ensure the mobile terminal may be monitored and tracked by the security monitoring system.

Ways of restriction processing may include restricting the registration attempt number of the mobile terminal at the pseudo base station, restricting the resident duration of the mobile terminal at the pseudo base station, controlling the mobile terminal to select/reelect the pseudo base station cell, etc., which will not be defined in detail here. Specifically, taking restricting the resident duration of the mobile terminal at the pseudo base station for an example, it is understandable that, under normal circumstances, when the mobile terminal is attacked by a pseudo base station, it will generally be returned to normal after temporarily off line for 8-12 seconds. That is to say, the mobile terminal may be attacked by a pseudo base station within 8-12 seconds. Therefore, as a way, when it is determined that the base station is a pseudo base station, the duration of the mobile terminal accessing the pseudo base station may be restricted, for example, the duration of the mobile terminal accessing the pseudo base station is limited to 4-6 seconds, 7-9 seconds, etc., to rapidly restore normal network use of the mobile terminal and reduce the duration of the mobile terminal being attacked by the pseudo base station.

At block S102, it is judged whether the restriction processing meets a preset condition.

In an embodiment, the preset condition may be set by the mobile terminal, configured as a judgment basis for restriction processing. It should be understood that, the preset condition may be stored locally in advance by the mobile terminal and may be set when judging, which will not be defined here. The preset condition may be automatically configured by the mobile terminal, manually configured by the users corresponding to the mobile terminal, or may be sent to the mobile terminal after configured by a server connected to the mobile terminal, which will not be defined here. Further, after obtaining the restriction processing, the restriction processing is compared with the preset condition to judge whether the restriction processing meets the preset condition.

For example, when the restriction processing is to restrict registration attempt number of the mobile terminal at the pseudo base station, the preset condition may be a number threshold, that is to say, a registration attempt number may be compared with a threshold number; when the registration attempt number exceeds the number threshold, representing the restriction processing meets the preset condition, and when the registration attempt number doesn't exceed the number threshold, representing the restriction processing doesn't meet the preset condition.

For another example, when the restriction processing is to restrict resident duration of the terminals at different places at the pseudo base station, the preset condition may be a number threshold, that is, a resident duration may be compared with a time threshold; when the resident duration exceeds a time threshold, representing the restriction processing meets the preset condition, and when the resident duration doesn't exceed the duration threshold, representing the restriction processing doesn't meet the preset condition.

At block S103, the mobile terminal is prohibited from accessing the pseudo base station in response to the restriction processing meeting the preset condition.

Further, when it is determined that the restriction processing meets the preset condition, for example, when the registration attempt number exceeds a number threshold and the resident duration exceeds a duration threshold, the mobile terminal is prohibited from accessing the pseudo base station. When the restriction processing meets the preset condition, it represents the mobile terminal has accessed the pseudo base station several times, attempted to access the pseudo base station several times or accessed the pseudo base station for a certain duration. It should be understood that, the mobile terminal may be always attacked by the pseudo base station or always be in abnormal business state and have bad user experience during this period, therefore, as a way, the mobile terminal may be temporarily prohibited from accessing the pseudo base station so that the mobile terminal is prevented from being attacked by the pseudo base station during the time period of prohibiting accessing the pseudo base station and security and user experience of the mobile terminal is improved.

With the method for handling a pseudo base station is provided in the present disclosure, restriction processing is performed on a registration network of the mobile terminal at the pseudo base station in response to determining a pseudo base station, it is judged whether the restriction processing meets a preset condition, and the mobile terminal is prohibited from accessing the pseudo base station in response to the restriction processing meeting the preset condition, thereby restricting the pseudo base station from excessively affecting the user's normal business and improving information security of the mobile terminal.

Figure 4:
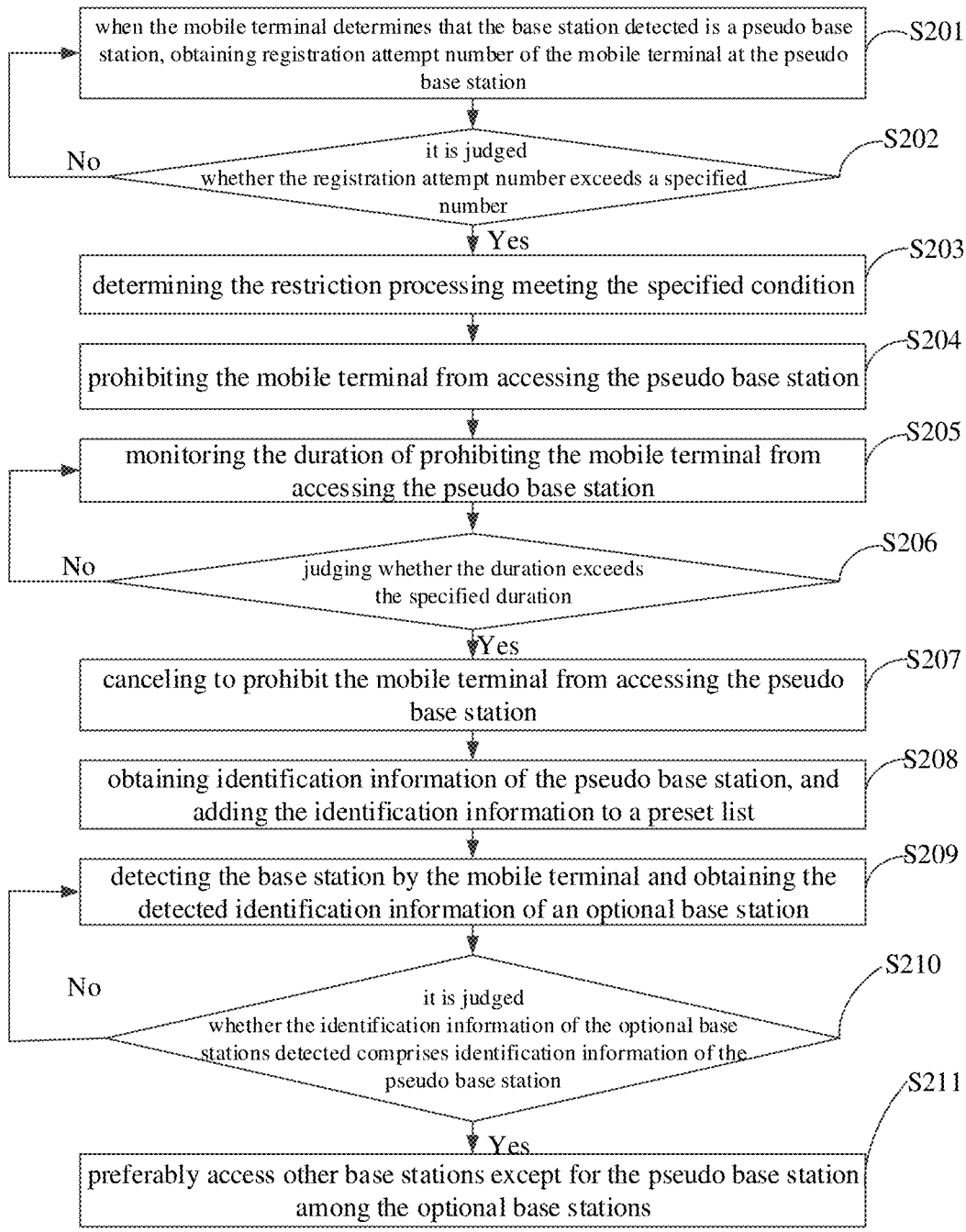
FIG. 4 is a flowchart illustrating a method for handling a pseudo base station in another embodiment of the present disclosure.

Referring to FIG. 4, FIG. 4 is a flowchart illustrating a method for handling a pseudo base station in an embodiment of the present disclosure. The method is applied to the above mobile terminal. The procedure as shown in FIG. 4 will be described in detail below. The method for handling a pseudo base station may specifically include the followings.

At block S201, a registration attempt number of the mobile terminal at the pseudo base station is obtained in response to determining a pseudo base station.

In an embodiment, the restriction processing way include restricting the registration attempt number of the mobile terminal at the pseudo base station. When the mobile terminal determines that the base station detected is a pseudo base station, the registration attempt number of the mobile terminal at the pseudo base station is detected, as a first way, it may be calculated from the first registration attempt of the mobile terminal at the pseudo base station and each subsequent registration attempt of the mobile terminal at the pseudo base station may be recorded, and then all the registration attempts are counted to obtain the registration attempt number of the mobile terminal at the pseudo base station; as a second way, it may be calculated from the registration attempts of the mobile terminal at the pseudo base station within a recent period of time and each subsequent registration attempt of the mobile terminal at the pseudo base station may be recorded, and then the registration attempts within a recent period of time are counted to obtain the registration attempt number of the mobile terminal at the pseudo base station. The recent period of time may include recent one month, recent half month, and recent one week, which will not be defined here.

Further, when the mobile terminal make registration attempt on the pseudo base station, no matter whether the registration attempt is successful, the pseudo base station may send feedback information to the mobile terminal, and the feedback information may carry identification information of the pseudo base station, therefore, when the mobile terminal receives the feedback information sent by the pseudo base station every time, identification information may be extracted and recorded from the feedback information, and then accumulated to obtain the sum of identity information, that is the registration attempt number of the mobile terminal at the pseudo base station.

At block S202, it is judged whether the registration attempt number exceeds a preset number.

As a way, the preset number is set by the mobile terminal, configured as a judgment basis of the registration attempt number. It should be understood that, the preset number may be stored locally in advance by the mobile terminal and may be set when judging, which will not be defined here. The preset number may be automatically configured by the mobile terminal, manually configured by the users corresponding to the mobile terminal, or may be sent to the mobile terminal after configured by a server connected to the mobile terminal, which will not be defined here. Further, after obtaining the registration attempt number, the registration attempt number is compared with the preset number to judge whether the registration attempt number exceeds the preset number.

At block S203, the restriction processing meeting the preset condition is determined in response to the registration attempt number exceeding the preset number.

In an embodiment, the preset number is a natural number, that is, the preset number may include non-negative integers such as 0, 1, 2, 3, etc. In this embodiment, when the preset number is zero, representing when the registration attempt number of the mobile terminal exceeds zero, the restriction processing meets the preset conditions. Therefore, it is understandable that, the registration attempt number of allowing the mobile terminal at the pseudo base station at this time is zero, that is, directly prohibiting registration attempt of the mobile terminal at the pseudo base station.

At block S204, the mobile terminal is prohibited from accessing the pseudo base station in response to the restriction processing meeting the preset condition.

As an implementation way, prohibiting the mobile terminal from accessing the pseudo base station includes prohibiting the mobile terminal from detecting feature parameters corresponding to the pseudo base station, in which the feature parameters include a Tracking Area Identity (TAI) and an eutra absolute radio frequency channel number (EARFCN), a physical cell identity (PCI), a cell identity (CID), etc. The feature parameters corresponding to the pseudo base station may further include others, which will not be repeated here. In an embodiment, a pseudo base station may be identified by feature parameters corresponding to the pseudo base station, and the mobile terminal is prohibited from accessing the pseudo base station based on the identification.

At block S205, a duration of prohibiting accessing the pseudo base station is detected.

In an embodiment, when the mobile terminal is prohibited from accessing the pseudo base station, the duration during which the mobile terminal is prohibited from accessing the pseudo base station is detected and recorded. The detection ways may include real-time detection, predetermined intervals detection or a detection according to time intervals set by the users themselves. Optionally, in order to improve the accuracy of detecting the duration obtained, real-time detection may be configured.

Figure 5:
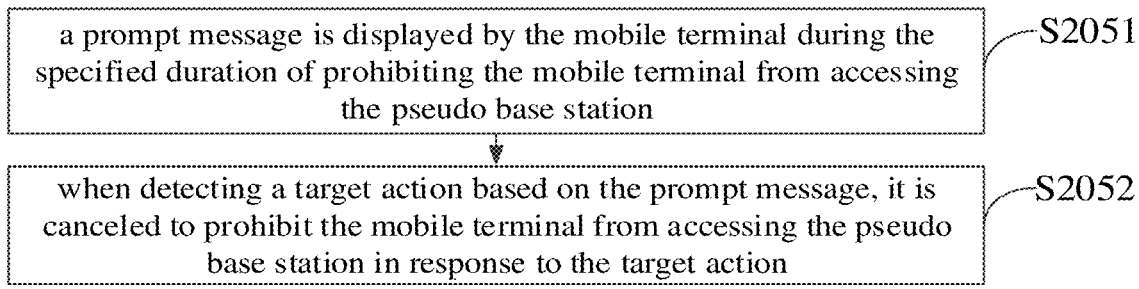
FIG. 5 is a flowchart illustrating a block S205 of a method for handling a pseudo base station as shown in FIG. 4 of the present disclosure.

Referring to FIG. 5, FIG. 5 is a flowchart illustrating a block S205 of a method for handling a pseudo base station as shown in FIG. 4 of the present disclosure. The procedure shown in FIG. 5 will be described in detail below. The method may specifically include the followings.

At block S2051, a prompt message is displayed during the preset duration of prohibiting the mobile terminal from accessing the pseudo base station.

As an implementable way, within the preset duration during which the mobile terminal is prohibited from accessing the pseudo base station, a prompt message may be output by a mobile terminal, to remind the user that the mobile terminal is currently in a state of prohibiting accessing the pseudo base station. In an embodiment, the prompt message may be displayed on the screen of the mobile terminal or output through the speaker of the mobile terminal. When the prompt message is output on the screen of the mobile terminal, the prompt message may be displayed on the status bar of the mobile terminal, or displayed on the negative one screen of the mobile terminal. At this time, the prompt message may include a text prompt message, a picture prompt message, a graphic prompt message, a color prompt message, etc., which are not defined here; when the prompt message is output through the speaker of the mobile terminal, the prompt message is a voice message, in which the prompt message may be sent out once at regular intervals within the preset duration of prohibiting the mobile terminal from accessing the pseudo base station.

As a way, as the pseudo base station used by most offenders is a 2G network, and the pseudo base station adopted by most security monitoring systems is a 4G network, the mobile terminal is configured to maintain the 4G network within the preset duration of accessing the pseudo base station. In the preset duration, the mobile terminal has always been in the state of connecting to a 4G network and is not allowed to switch to the state of connecting to a 2G network. Therefore, the pseudo base station used by offenders may be prohibited from attacking the mobile terminal through a 2G network, and at the same time the pseudo base station used by the security monitoring system is allowed to monitor a mobile terminal through a 4G network, so that the mobile terminal is prohibited from accessing the pseudo base station used by offenders, the mobile terminal has always been allowed to be monitored by the pseudo base station corresponding to the security monitoring system.

At block S2052, it is continued to access the pseudo base station in response to a target action based on the prompt message.

Further, on one hand, the user corresponding to the terminal may understand the current state of the mobile terminal based on the prompt message; on the other hand, the user corresponding to the mobile terminal may also execute corresponding operations based on the prompt message. Therefore, as a way, the mobile terminal pre-establishes the corresponding relationship between the prompt message and the target operation, that is, when the target operation triggered by the user is detected, it may be considered that the user executes the corresponding operation based on the prompt message. Specifically, the mobile terminal detects the operation triggered by the user. If it is detected that the operation triggered by the user is consistent with the target operation, the mobile terminal cancels prohibiting the mobile terminal from accessing the pseudo base station as the response, that is to say, restriction processing is no longer performed on the network of the mobile terminal at the pseudo base station, to cooperate to report the information required by the security monitoring system.

At block S206, it is judged whether the duration exceeds the preset duration.

In an embodiment, the preset duration is set by the mobile terminal, configured as a judgment basis of the duration during which the mobile terminal is prohibited from accessing the pseudo base station. It should be understood that, the preset duration may be stored locally in advance by the mobile terminal and may be set when judging, which will not be defined here. The preset duration may be automatically configured by the mobile terminal, manually configured by the users corresponding to the mobile terminal, or may be sent to the mobile terminal after configured by a server connected to the mobile terminal, which will not be defined here. Further, after obtaining the duration during which the mobile terminal is prohibited from accessing the pseudo base station, the duration is compared with the preset duration to judge whether the duration exceeds the preset duration.

At block S207, it is continued to access the pseudo base station in response to the duration exceeding the preset duration.

Further, when it is determined that the duration exceeds the preset duration, the mobile terminal is canceled prohibited from accessing the pseudo base station, that is, restriction processing is no longer performed on the registration network of the mobile terminal on the pseudo base station to coordinate to report the information required by the security monitoring system. It is understandable that, through the above way, the mobile terminal may be reduced being attacked by the pseudo base station, and not completely prohibited from accessing the pseudo base station at the same time, to ensure the mobile terminal may be monitored and tracked by the pseudo base station used by the security monitoring system.

At block S208, identification information of the pseudo base station is obtained and added to a preset list.

In an embodiment, the identification information of the pseudo base station determined by the mobile terminal is extracted. It is understandable that the identification information may be extracted from the broadcast information sent by the pseudo base station. As a way, if the mobile terminal is in an Android operating system, the mobile terminal may call a Telephony Manager class to obtain identification information of the broadcast information parsed by the mobile terminal, in which the identification information may include a TAI.

Further, the mobile terminal presets and stores a preset list, which is configured to collect identification information of the pseudo base station determined by the mobile terminal. Therefore, after the identification information of the pseudo base station is obtained, the identification information may be added in the preset list as the basis for identifying the pseudo base station, that is, when the mobile terminal detects the base station again, it may be determined whether the base station is a pseudo base station by identification information comparison.

At block S209, the base station is detected and identification information of detected base stations is obtained.

Generally, in the process of detecting a base station, the mobile terminal may simultaneously detect multiple optional base stations, and then the user determines one base station from the multiple optional base stations to be manually connected, or the mobile terminal determines one base station from multiple optional base stations to be automatically connected. However, the base stations detected by the mobile terminal may simultaneously include a normal base station and a pseudo base station. Therefore, in order to reduce the mobile terminal being attacked by the pseudo base station, the possibility of accessing the pseudo base station by the mobile terminal needs to reduced. As a way, a pseudo base station may be identified from the multiple optional base stations and the mobile terminal is controlled not to connect the pseudo base station, or to connect the pseudo base station again finally.

In an embodiment, identification information of the detected optional base stations by the mobile terminal may be obtained respectively and the identification information is configured to judge whether the optional base station is a pseudo base station.

At block S210, it is judged whether the identification information of the optional base stations detected comprises identification information of the pseudo base station.

Further, identification information of the optional base station is compared with all identification information added in the preset list, for example, the identification information of the optional base station is matched with all identification information in the preset list one by one to judge whether the identification information consistent with the identification information of the optional base station is included in the preset list. It is understandable that, when the preset list includes identification information consistent with the identification information of the optional base station, it may be determined that the optional base station includes a pseudo base station; when the preset list doesn't include identification information consistent with the identification information of the optional base station, it may be determined that the optional base station doesn't include a pseudo base station.

At block S211, other base stations except the pseudo base station among the detected base stations are preferably accessed in response to the identification information of the optional base stations comprising identification information of the pseudo base station.

When it is determined that the optional base stations include a pseudo base station, it represents that the optional base stations simultaneously include a normal base station and a pseudo base station. Therefore, as a way, the mobile terminal is controlled to preferentially access other base stations identified as pseudo base stations from the optional base stations, to ensure the mobile terminal may preferentially access a normal base station and reduce the mobile terminal being attacked by a pseudo base station.

Figure 6:
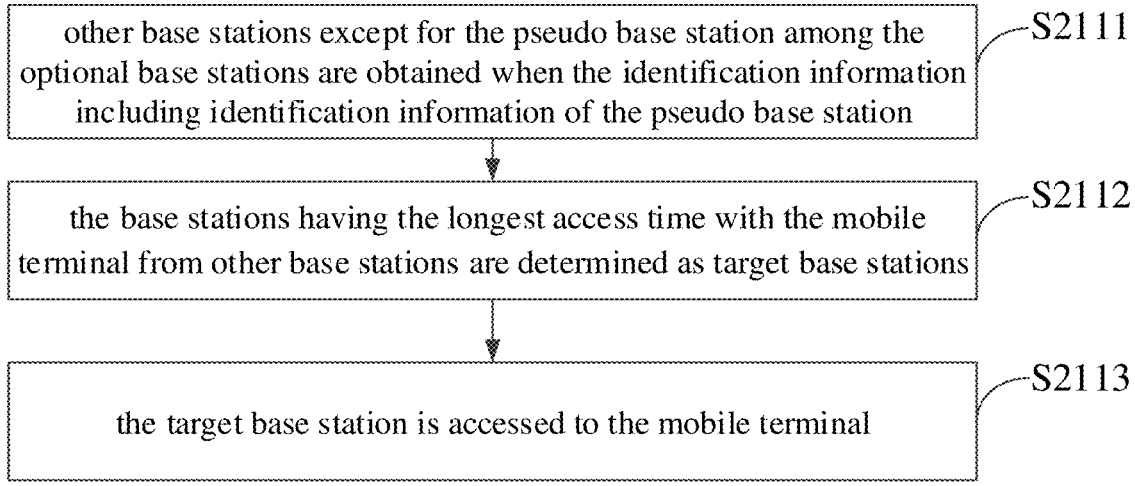
FIG. 6 is a flowchart illustrating a block S211 of a method for handling a pseudo base station as shown in FIG. 4 of the present disclosure.

Referring to FIG. 6, FIG. 6 is a flowchart illustrating a block S211 of a method for handling a pseudo base station as shown in FIG. 4 of the present disclosure. The procedure shown in FIG. 6 will be described in detail below. The method may specifically include the followings.

At block S2111, the base stations except the pseudo base station among the detected base stations are obtained in response to the identification information including identification information of the pseudo base station.

When it is determined that the optional base stations include pseudo base stations, other base stations in addition to a pseudo base station may be obtained from the optional base stations. For example, optional base stations include a normal base station A, a normal base station B, a normal base station C and a pseudo base station D. Then, a normal base station A, a normal base station B and a normal base station C may be extracted from optional base stations to wait for next operation.

At block S2112, a target base station having the longest access time with the mobile terminal is determined from the obtained base stations.

Further, the base stations with the longest access time with the mobile terminal are respectively obtained from other base stations, that is, a base station cell corresponding to each base station may be obtained respectively from other base stations, and resident duration of the mobile terminal at each base station may be obtained. The resident duration is positively correlated with the access duration, and then the resident time of the mobile terminal in each base station cell is compared, and the base station corresponding to the base station cell with the longest resident duration is determined as a target base station. For example, other base stations include a normal base station A, a normal base station B and a normal base station C. The duration of a mobile terminal accessing a normal base station A is A1, the duration of accessing a normal base station B is B1, and the duration of accessing a normal base station C is C1, and A1>B1>C1, the normal base station A may be determined as the target base station.

At block S2113, the target base station is accessed.

It is understandable that the base station with the longest access time of the mobile terminal is the base station most frequently used by the mobile terminal, that is, it is trusted by the user corresponding to the mobile terminal, its stability is stronger than other base stations, and the possibility of a pseudo base station is relatively lower than other base stations. Therefore, the mobile terminal may be accessed to the target base station to improve user experience.

With the method for handling a pseudo base station is provided in another embodiment of the present disclosure, when the mobile terminal determines that the detected base station is a pseudo base station, the registration attempt number of the mobile terminal at the pseudo base station is obtained, and when the registration attempt number exceeds the preset number, it is determined that the restriction processing meets the preset conditions, the mobile terminal is prohibited from accessing the pseudo base station, and the duration during which the mobile terminal is prohibited from accessing the pseudo base station is detected, and when the duration exceeds the preset duration, the mobile terminal is canceled prohibited from accessing the pseudo base station. In addition, the identification information of the pseudo base station is obtained, and the identification information is added to the preset list. The mobile terminal detects the base station, and obtains the detected identification information of the optional base station, and when the identification information of the optional base station includes identification information of the pseudo base station, preferentially accesses other base stations in addition to the pseudo base station from optional base stations. Compared with the method for handling a pseudo base station as shown in FIG. 3, the mobile terminal is canceled prohibited from accessing the pseudo base station when the prohibiting duration of the pseudo base station exceeds the preset duration, so as to ensure the security monitoring system may monitor the mobile terminal under the premise of restricting a pseudo base station from excessively affecting the user's normal business; in addition, when the mobile terminal detects connection of the base station, a normal base station is preferably accessed to reduce the mobile terminal being attacked by the pseudo base station.

Figure 7:
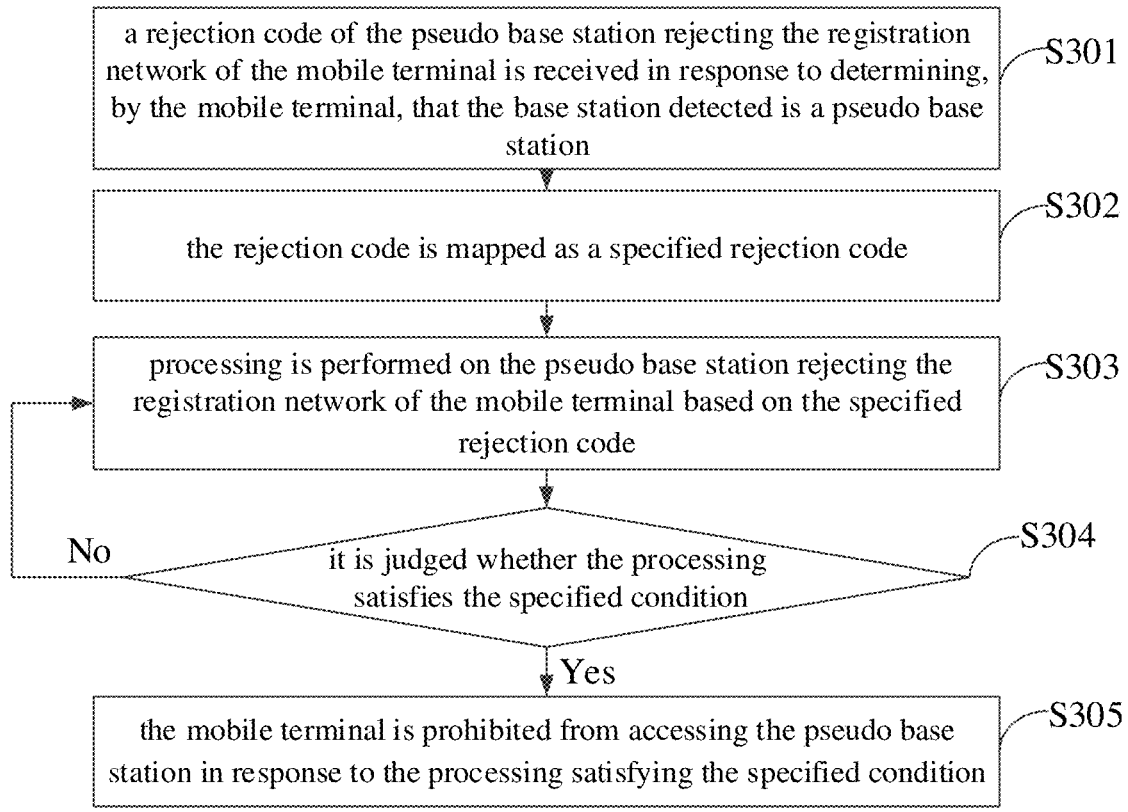
FIG. 7 is a flowchart illustrating a method for handling a pseudo base station in another embodiment of the present disclosure.

Referring to FIG. 7, FIG. 7 is a flowchart illustrating a method for handling a pseudo base station in another embodiment of the present disclosure. The method is applied to the above mobile terminal. The procedure as shown in FIG. 7 will be described in detail below. The method for handling a pseudo base station may specifically include the followings.

At block S301, a rejection code rejecting the registration network of the mobile terminal is received from the pseudo base station in response to determining, by the mobile terminal, that the base station detected is a pseudo base station.

In an embodiment, rejection means that a network base station rejects a registration request attach or tau request of a mobile terminal due to some reasons or temporary network errors. Similarly, when a mobile terminal registers a network at a pseudo base station, the pseudo base station may also reject the registration network of the mobile terminal due to some reasons or temporary network errors, and generate a rejection code and send it to the mobile terminal. Therefore, the mobile terminal receives the rejection code.

At block S302, the rejection code is mapped as a preset rejection code.

According to the regulation of 3GPP24.301 Agreement, different rejection codes correspond to different processing methods for a mobile terminal, for example, with a rejection code 11 (plmn not allow), the mobile terminal may add the current operator plmn to a plmn forbidden list, and be completely prohibited from accessing a 4G/3G/2G network of the operator; for another example, with a rejection code 13 (roaming not allow in this tai), a mobile terminal may be prohibited from the current TAI and attempt other TAIs. Therefore, as a way, the mobile terminal may uniformly map a rejection code as a preset rejection code, and the mobile terminal processes the rejection of a pseudo base station based on the preset rejection code, and unifies the rejection processing behavior of a mobile terminal.

At block S303, processing is performed on the pseudo base station rejecting the registration network of the mobile terminal based on the preset rejection code.

It is understandable that, as rejection codes feed backed by the pseudo base station vary, the corresponding processing methods of the mobile terminal may vary, which will have a great impact on the user's normal use of a 4G network. Therefore, in this embodiment, the processing method of the pseudo base station refusing the mobile terminal to register a network may be unified to reduce the impact on a mobile terminal.

Figure 8:
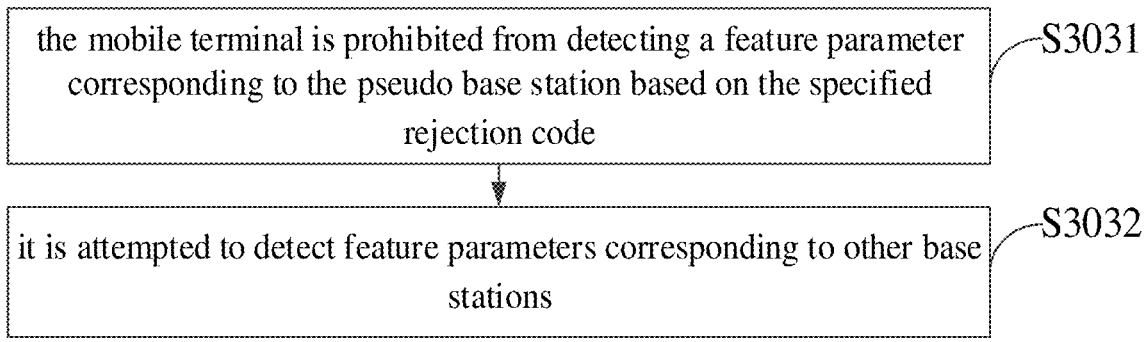
FIG. 8 is a flowchart illustrating a block S303 of a method for handling a pseudo base station as shown in FIG. 7 of the present disclosure.

Referring to FIG. 8, FIG. 8 is a flowchart illustrating a block S303 of a method for handling a pseudo base station as shown in FIG. 7 of the present disclosure. The procedure shown in FIG. 8 will be described in detail below. The method may specifically include the following blocks:

At block S3031, the mobile terminal is prohibited from detecting a feature parameter corresponding to the pseudo base station based on the preset rejection code.

At block S3032, it is attempted to detect feature parameters corresponding to other base stations.

As a way, the preset rejection code may be a rejection code 13, that is, a mobile terminal is prohibited from detecting feature parameters corresponding to the pseudo base station and attempts to detect feature parameters corresponding to other base stations for rejection processing of a pseudo base station. The feature parameters may include at least one of TAI, EARFCN, PCI, and CID.

At block S304, it is judged whether the processing meets the preset condition.

At block S305, the mobile terminal is prohibited from accessing the pseudo base station in response to the processing meeting the preset condition.

For specific descriptions of blocks S304-S305, please refer to blocks S102-S103, which will not be repeated here. With the method for handling a pseudo base station is provided in another embodiment of the present disclosure, when a mobile terminal determines that the detected base station is a pseudo base station, a rejection code of the pseudo base station rejecting the mobile terminal to register a network is received, and the rejection code is deemed as the preset rejection code; processing is performed on the pseudo base station refusing the mobile terminal to register a network based on the preset rejection code, to judge whether the processing meets the preset conditions; when the processing meets the preset conditions, the mobile terminal is prohibited from accessing the pseudo base station. Compared with the method for handling a pseudo base station as shown in FIG. 3, in this embodiment, after the mobile terminal receives the rejection code of the pseudo base station, the rejection code is mapped to a preset rejection code to unify the processing method of the mobile terminal and reduce the impact on the mobile terminal.

Referring to FIG. 9, FIG. 9 is a module block diagram illustrating an apparatus 200 for handling a pseudo base station in an embodiment of the present disclosure. The apparatus 200 for handling a pseudo base station is applied to the above mobile terminal. The apparatus shown in FIG. 9 will be described below. The apparatus 200 for handling a pseudo base station includes: a restriction processing module 201, a condition judging module 202, and an access prohibiting module 203. The restriction processing module 201, is configured to, perform restriction processing on a registration network of the mobile terminal at the pseudo base station in response to determining a pseudo base station; the condition judging module 202, is configured to judge whether the restriction processing meets a preset condition; the access prohibiting module 203, is configured to, prohibit the mobile terminal from accessing the pseudo base station in response to the restriction processing meeting the preset condition.

Figure 10:
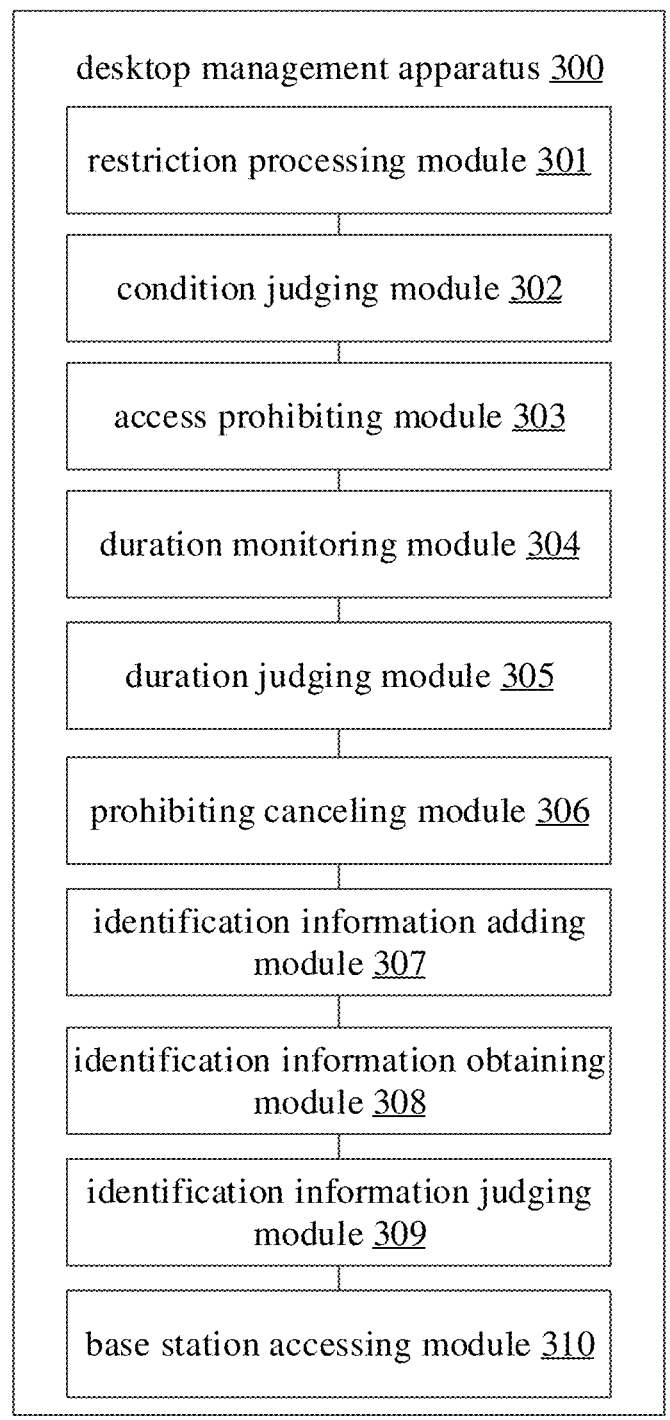
FIG. 10 is a module block diagram illustrating an apparatus for handling a pseudo base station in another embodiment of the present disclosure.

Referring to FIG. 10, FIG. 10 is a module block diagram illustrating an apparatus 300 for handling a pseudo base station in another embodiment of the present disclosure. The apparatus 300 for handling a pseudo base station is applied to the above mobile terminal. The apparatus shown in FIG. 10 will be described below. The apparatus 300 for handling a pseudo base station includes: a restriction processing module 301, a condition judging module 302, an access prohibiting module 303, a duration monitoring module 304, a duration judging module 305, a prohibiting canceling module 306, an identification information adding module 307, an identification information obtaining module 308, an identification information judging module 309 and a base station accessing module 310.

The restriction processing module 301, is configured to, perform the restriction processing on the registration network of the mobile terminal at the pseudo base station in response to in response to determining a pseudo base station. Further, the restriction processing module 301 includes: a number obtaining submodule.

The number obtaining submodule, is configured to, when the mobile terminal determines that the base station detected is a pseudo base station, obtaining a registration attempt number of the mobile terminal at the pseudo base station in response to determining the pseudo base station.

The condition judging module 302, is configured to judge whether the restriction processing meets the preset condition. Further, the condition judging module 302 include: a number judging submodule and a condition determining submodule.

The number judging submodule is configured to judge whether the registration attempt number exceeds a preset number.

The condition determining submodule is configured to, determine the restriction processing meeting the preset condition in response to the registration attempt number exceeding the preset number.

The access prohibiting module 303, is configured to, prohibit the mobile terminal from accessing the pseudo base station in response to the restriction processing meeting the preset condition. Further, the access prohibiting module 330 includes: a feature parameter prohibiting submodule.

The feature parameter prohibiting submodule is configured to prohibit the mobile terminal from detecting a feature parameter corresponding to the pseudo base station in response to the restriction processing meeting the preset condition.

The duration monitoring module 304, is configured to detect a duration of prohibiting accessing the pseudo base station. Further, the duration monitoring module includes: a prompt message displaying submodule and a prohibiting canceling submodule.

The prompt message displaying submodule, is configured to, display a prompt message by the mobile terminal during the preset duration of prohibiting the mobile terminal from accessing the pseudo base station.

The prohibiting canceling submodule, is configured to, continue to access the pseudo base station in response to a target action based on the prompt message.

The duration judging module 305, is configured to judge whether the duration exceeds a preset duration.

The prohibiting canceling module 306, is configured to, continue to access the pseudo base station in response to the duration exceeding a preset duration.

The identification information adding module 307, is configured to obtain identification information of the pseudo base station, and add the identification information to a preset list.

The identification information obtaining module 308, is configured to detect the base station by the mobile terminal and obtain identification information of an optional base station detected.

The identification information judging module 309, is configured to judge whether the identification information of the optional base stations detected comprises identification information of the pseudo base station.

The base station accessing module 310, is configured to, preferably access other base stations except the pseudo base station among the optional base stations in response to the identification information of the optional base stations comprising identification information of the pseudo base station. Further, the base station accessing module 310 includes: a base station obtaining submodule, a target base station determining submodule and a target base station accessing submodule.

The base station obtaining submodule, is configured to, obtain other base stations except the pseudo base station among the optional base stations in response to the identification information comprising identification information of the pseudo base station.

The target base station determining submodule, is configured to determine the base station having the longest access time with the mobile terminal from other base stations as a target base station.

The target base station accessing submodule, is configured to access the target base station to the mobile terminal.

Referring to FIG. 11, FIG. 11 is a module block diagram illustrating an apparatus 400 for handling a pseudo base station in another embodiment of the present disclosure.

The apparatus 400 for handling a pseudo base station is applied to the above mobile terminal. The apparatus shown in FIG. 11 will be described below. The apparatus 400 for handling a pseudo base station includes: a rejection code receiving module 401, a rejection code mapping module 402, a rejection processing module 403, a condition judging module 404 and a prohibiting accessing module 405.

The rejection code receiving module 401, is configured to, receive a rejection code of the pseudo base station rejecting the mobile terminal to register a network in response to determining, by the mobile terminal, that the base station detected is a pseudo base station.

The rejection code mapping module 402, is configured to map the rejection code as a preset rejection code.

The rejection processing module 403, is configured to process on the registration network of the mobile terminal rejected by the pseudo base station based on the preset rejection code. Further, the rejection processing module 403 includes: a feature parameter prohibiting submodule and a feature parameter attempting submodule.

The feature parameter prohibiting submodule, is configured to prohibit the mobile terminal from detecting a feature parameter corresponding to the pseudo base station based on the preset rejection code.

The feature parameter attempting submodule, is configured to attempt to detect feature parameters corresponding to other base stations.

The condition judging module 404, is configured to judge whether the processing meets the preset condition.

The prohibiting access module 405, is configured to, prohibit the mobile terminal from accessing the pseudo base station in response to the restriction processing meeting the preset condition.

Those skilled in the art may clearly understand that, the specific working process of an apparatus and modules described above may refer to the corresponding process in the above method of embodiments, which will not be repeated here.

In several embodiments of the present disclosure, the coupling between the modules may be electrical, mechanical or in other forms.

In addition, functional modules in embodiments of the present disclosure may be integrated in one processing module, or may be physically existed separately, or two or more modules may be integrated in one module. The above integrated module may be implemented in the form of a hardware or in the form of a software functional module.

Figure 12:
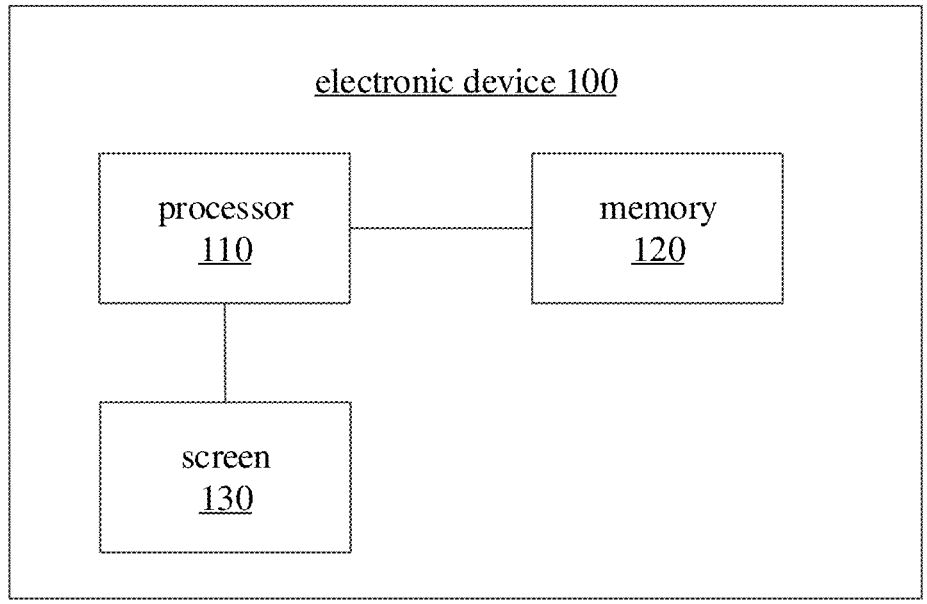
FIG. 12 is a block diagram illustrating an electronic device configured to implement a method for handling a pseudo base station according to an embodiment of the present disclosure.

FIG. 12 is a schematic diagram illustrating a mobile terminal 100 provided in embodiments of the present disclosure. The mobile terminal 100 may be a mobile terminal which may run applications such as a smart phone, a tablet computer, e-books, etc. The mobile terminal 100 in the present disclosure may include one or more following components: a processor 110, a memory 120, a screen 130 and one or more application programs, in which one or more application programs may be stored in the memory 120 and configured to be executed by one or more processors 110, and one or more program configurations are used to execute the method described in the above embodiment of the method.

The processor 110 may include one or more Power Processor Units (PPUs). The processor 110 connects various components of the entire mobile terminal 100 through various interfaces and circuits, and executes various functions and processing data of the mobile terminal 100 by running or executing instructions, programs, code sets or instruction sets stored in the memory 120, and calling data stored in the memory 120. Optionally, the processor 110 may be implemented by adopting at least one hardware form of a digital signal processing (DSP), a field programmable gate array (FPGA), and a programmable logic array (PLA). The processor 110 may integrate one or several combinations of a central processing unit (CPU), a graphics processing unit (GPU), and a modem, etc. A CPU mainly deals with an operating system, a user interface and an application program, etc.; a GPU is configured to render and draw the display content; a modem is configured to process wireless communication. It is understandable that the above modem may be not integrated in a processor 110 but independently implemented by a communication chip.

A memory 120 may include a Random Access Memory (RAM), or may include a Read-Only Memory (ROM). The memory 120 may be configured to store instructions, programs, codes, code sets or instruction sets. The memory 120 may include a program storage area and a data storage area. The program storage area may store instructions configured to implement an operating system, instructions configured to implement at least one function (for example, touching function, sound playing function, image playback function, etc.), instructions configured to implement the following embodiments of the method, etc. The data storage area may store data created in use of the mobile terminal 100 (for example, a phone book, audio and video data, chatting record data).

Further, a screen 130 may be a Liquid Crystal Display (LCD), an Organic Light-Emitting Diode (OLED), etc. The screen 130 is configured to display information entered by the user, the information provided to the user and various graphic user interfaces of the mobile terminal. The graphic user interfaces may consist of graphics, texts, icons, numbers, videos and any combination thereof.

Figure 13:
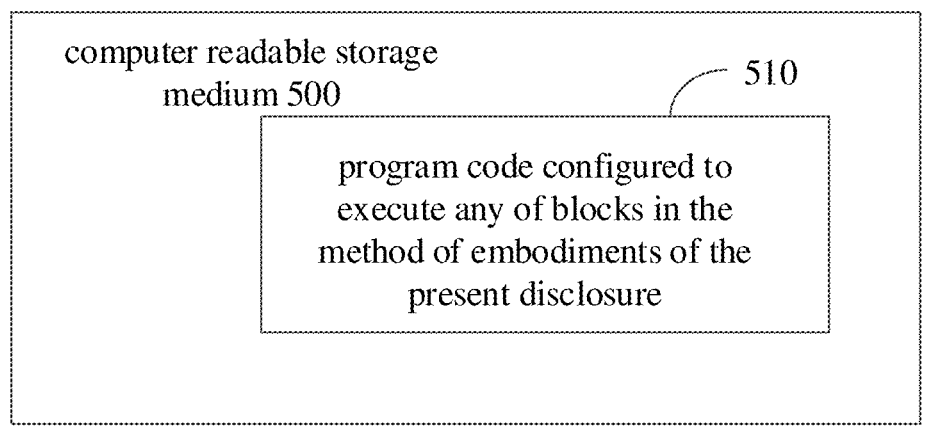
FIG. 13 illustrates a memory cell configured to store or carry a program code that implements a method for handling a pseudo-base station according to an embodiment of the present disclosure.

FIG. 13 is a schematic diagram illustrating a computer readable storage medium 500 provided in embodiments of the present disclosure. A computer readable storage medium 500 stores a program code, in which the program code may be called by the processor to execute the above method of embodiments.

A computer readable storage medium 500 may be an electronic memory such as a flash memory, an Electrically Erasable Programmable Read Only Memory (EEPROM), an EPROM, a hard disk or a ROM. Optionally, a computer readable storage medium 500 includes a non-transitory computer-readable storage medium. The computer readable storage medium 500 has a storage space of a program code 510 configured to execute any of blocks in the above method. The program code may be read from or written in one or more computer program products. The program code 510 may be compressed in proper form.

In summary, a method and an apparatus for handling a pseudo base station, a mobile terminal and a storage medium are provided in the present disclosure; when the mobile terminal determines that the detected base station is a pseudo base station, performing restriction processing on the registration network of the mobile terminal at the pseudo base station, and judging whether the restriction processing meets the preset conditions; when the restriction processing meets the preset conditions, prohibiting the mobile terminal from accessing the pseudo base station, thereby restricting the pseudo base station from excessively affecting the user's normal business and improving information security of the mobile terminal.

Finally, it should be noted that the above embodiments are only configured to describe the technical solution of the present disclosure instead of limitation; notwithstanding the present disclosure is described in detail with reference to the above embodiments, those skilled in the art may understand that the technical solution recorded in the above embodiments may still be modified or part of technical features therein may be equivalently substituted; however, such modification or substitution doesn't deviate the nature of the corresponding technical solution from the spirit and scope of the technical solution in embodiments of the present disclosure.

What is claimed is:

1. A method for handling a pseudo base station, for a mobile terminal, comprising:
    attempting registration of the mobile terminal at the pseudo base station;
    obtaining a registration attempt number of the mobile terminal at the pseudo base station;
    determining whether the registration attempt number exceeds a preset number;
    prohibiting accessing the pseudo base station in response to a determination that the registration attempt number exceeds the preset number;
    detecting a duration of prohibiting accessing the pseudo base station;
    comparing the duration of prohibiting accessing the pseudo base station with a preset duration stored locally by the mobile terminal;
    determining whether the pseudo base station is from a security monitoring system based on a feature parameter, wherein the feature parameter comprises at least one of a tracking area identity (TAI), an eutra absolute radio frequency channel number (EARFCN), a physical cell identity (PCI), or a cell identity (CID); and
    in response to a determination that the duration exceeds the preset duration and a determination that the pseudo base station is from the security monitoring system, allowing accessing the pseudo base station to report information to the security monitoring system.

2. The method of claim 1, wherein the preset number is zero.

3. The method of claim 1, further comprising:
    displaying a prompt message during the preset duration of prohibiting accessing the pseudo base station.

4. The method of claim 3, further comprising:
    continuing to access the pseudo base station in response to a target action based on the prompt message.

5. The method of claim 1, further comprising:
    configuring to maintain a 4G network connection during the preset duration of prohibiting accessing the pseudo base station.

6. The method of claim 1, further comprising:
    detecting the base station and obtaining identification information of detected base stations; and
    preferably accessing base stations except the pseudo base station among the detected base stations in response to the identification information of the detected base stations comprising identification information of the pseudo base station.

7. The method of claim 6, wherein preferably accessing base stations except the pseudo base station among the detected base stations in response to the identification information of the detected base stations comprising identification information of the pseudo base station comprises:
    obtaining the base stations except the pseudo base station among the detected base stations in response to the identification information comprising identification information of the pseudo base station;
    determining a target base station having the longest access time with the mobile terminal from the obtained base stations; and
    accessing the target base station.

8. The method of claim 6, further comprising:
    obtaining identification information of the pseudo base station, and adding the identification information to a preset list.

9. The method of claim 1, further comprising:
    receiving a rejection code rejecting a registration network of the mobile terminal from the pseudo base station;
    determining the rejection code as a preset rejection code; and
    rejecting the registration network of the mobile terminal based on the preset rejection code.

10. The method of claim 9, wherein, rejecting the registration network of the mobile terminal based on the preset rejection code, comprises:
    prohibiting detecting a feature parameter corresponding to the pseudo base station based on the preset rejection code; and
    detecting feature parameters corresponding to the base stations except the pseudo base station.

11. A mobile terminal for handling a pseudo base station, comprising:
    one or more processors;
    a memory storing instructions executable by the one or more processors;
    wherein the one or more processors are configured to:
        attempt registration of the mobile terminal at the pseudo base station;
        obtain a registration attempt number of the mobile terminal at the pseudo base station;
        determine whether the registration attempt number exceeds a preset number;
        prohibit accessing the pseudo base station in response to a determination that the registration attempt number exceeds the preset number;
        detect a duration of prohibiting accessing the pseudo base station;
        compare the duration of prohibiting accessing the pseudo base station with a preset duration stored locally by the mobile terminal;
        determine whether the pseudo base station is from a security monitoring system based on a feature parameter, wherein the feature parameter comprises at least one of a tracking area identity (TAI), an eutra absolute radio frequency channel number (EARFCN), a physical cell identity (PCI), or a cell identity (CID); and
        in response to a determination that the duration exceeds a preset duration and a determination being made that the pseudo base station is from the security monitoring system, allow accessing the pseudo base station to report information to the security monitoring system.

12. The mobile terminal of claim 11, wherein the one or more processors are configured to:
receive a rejection code rejecting a registration network of the mobile terminal from the pseudo base station;
determine the rejection code as a preset rejection code; and
reject the registration network of the mobile terminal based on the preset rejection code.

13. The mobile terminal of claim 12, wherein the one or more processors are configured to:
prohibit detecting a feature parameter corresponding to the pseudo base station based on the preset rejection code; and
detect feature parameters corresponding to the base stations except the pseudo base station.

14. A non-transitory computer readable storage medium, wherein the computer readable storage medium stores a program code, and the program code is called by a processor to execute a method for handling a pseudo base station, applied to a mobile terminal, and the method comprises:
attempting registration of the mobile terminal at the pseudo base station;
obtaining a registration attempt number of the mobile terminal at the pseudo base station;
determining whether the registration attempt number exceeds a preset number;
prohibiting accessing the pseudo base station in response to a determination that the registration attempt number exceeds the preset number;
detecting a duration of prohibiting accessing the pseudo base station;
comparing the duration of prohibiting accessing the pseudo base station with a preset duration stored locally by the mobile terminal;
determining whether the pseudo base station is from a security monitoring system based on a feature parameter, wherein the feature parameter comprises at least one of a tracking area identity (TAI), an eutra absolute radio frequency channel number (EARFCN), a physical cell identity (PCI), or a cell identity (CID); and
in response to a determination that the duration exceeds the preset duration and a determination that the pseudo base station is from the security monitoring system, allowing accessing the pseudo base station to report information to the security monitoring system.

* * * * *